US012620086B2

(12) United States Patent
Lenis et al.

(10) Patent No.: US 12,620,086 B2
(45) Date of Patent: May 5, 2026

(54) DOMAIN AWARE MEDICAL IMAGE CLASSIFIER INTERPRETATION BY COUNTERFACTUAL IMPACT ANALYSIS

(71) Applicants: AGFA Healthcare NV, Mortsel (BE); VRVIS Zentrum für Virtual Reality und Visualisierung Forschungs-GmbH, Vienna (AT)

(72) Inventors: Dimitrios Lenis, Mortsel (BE); David Major, Mortsel (BE); Maria Wimmer, Mortsel (BE); Gert Sluiter, Mortsel (BE); Astrid Berg, Mortsel (BE); Katja Buehler, Mortsel (BE)

(73) Assignees: AGFA Healthcare NV, Mortsel (BE); VRVIS Zentrum für Virtual Reality und Visualisierung Forschungs-GmbH, Vienna (AT)

( * ) Notice: Subject to any disclaimer, the term of this patent is extended or adjusted under 35 U.S.C. 154(b) by 611 days.

(21) Appl. No.: 18/011,920

(22) PCT Filed: Jun. 2, 2021

(86) PCT No.: PCT/EP2021/064763
    § 371 (c)(1),
    (2) Date: Dec. 21, 2022

(87) PCT Pub. No.: WO2021/259604
    PCT Pub. Date: Dec. 30, 2021

(65) Prior Publication Data
    US 2023/0177683 A1     Jun. 8, 2023

(30) Foreign Application Priority Data
    Jun. 22, 2020    (EP) ..................................... 20181403

(51) Int. Cl.
    *G06T 7/00*        (2017.01)
    *G06V 10/75*       (2022.01)
    *G06V 10/82*       (2022.01)

(52) U.S. Cl.
    CPC .......... *G06T 7/0012* (2013.01); *G06V 10/759* (2022.01); *G06V 10/82* (2022.01); *G06T 2207/20081* (2013.01); *G06V 2201/03* (2022.01)

(58) Field of Classification Search
    CPC ..... G06T 7/0012; G06V 10/82; G06V 10/759
    See application file for complete search history.

(56) References Cited

U.S. PATENT DOCUMENTS 11,768,919 B2 *  9/2023  Ryan .................... G06V 20/597
                                                        382/181
2018/0144248 A1 *  5/2018  Lu ............................ G06N 3/09
                        (Continued)

OTHER PUBLICATIONS

Chang et al., "Explaining Image Classifiers by Counterfactual Generation," *Arxiv.org*, Cornell University Library, 19 pp. (2018).
Dabkowski et al., "Real Time Image Saliency for Black Box Classifiers," *Arxiv.org*, Cornell University Library, 15 pp. (2017).
Fong et al., "Understanding Deep Networks via Extremal Perturbations and Smooth Masks," *2019 IEEE/CVF International Conference on Computer Vision (ICCV)*, 2950-2958 (2019).
                        (Continued)

*Primary Examiner* — Mohammed H Zuberi
(74) *Attorney, Agent, or Firm* — Leydig, Voit & Mayer, Ltd.

(57)         ABSTRACT
A neural network, trained for the task of deriving the attribution of image regions that significantly influence classification in a tool for pathology classification, comprising (i) a contracting branch, (ii) an attenuation module, (iii) an interconnected upsampling branch, and (iv) a final mapping module.

1 Claim, 5 Drawing Sheets

(56) References Cited

U.S. PATENT DOCUMENTS

| | | | | |
|---|---|---|---|---|
| 2020/0364624 | A1* | 11/2020 | Kearney | G06N 3/094 |
| 2020/0364860 | A1* | 11/2020 | Kearney | A61B 5/7267 |
| 2020/0372301 | A1* | 11/2020 | Kearney | G06N 3/045 |
| 2020/0381096 | A1* | 12/2020 | Zaharchuk | G06V 10/774 |
| 2020/0387829 | A1* | 12/2020 | Kearney | G06N 3/0895 |
| 2020/0405242 | A1* | 12/2020 | Kearney | G06T 7/0012 |
| 2020/0410649 | A1* | 12/2020 | Kearney | A61B 6/12 |
| 2020/0411167 | A1* | 12/2020 | Kearney | G06N 3/045 |
| 2021/0118099 | A1* | 4/2021 | Kearney | A61B 6/5217 |
| 2021/0118129 | A1* | 4/2021 | Kearney | A61B 6/5217 |
| 2021/0118132 | A1* | 4/2021 | Kearney | G06N 3/0442 |
| 2021/0319879 | A1* | 10/2021 | Zhao | G06T 5/73 |
| 2021/0357688 | A1* | 11/2021 | Kearney | G06N 3/0455 |
| 2022/0284583 | A1* | 9/2022 | Lee | G06V 10/774 |
| 2022/0284584 | A1* | 9/2022 | Lee | G06V 10/82 |
| 2022/0327693 | A1* | 10/2022 | Kim | A61B 6/469 |
| 2024/0195971 | A1* | 6/2024 | Besenbruch | G06T 9/002 |
| 2024/0290473 | A1* | 8/2024 | Ozcan | A61B 5/4331 |
| 2025/0046069 | A1* | 2/2025 | Ozcan | G06V 10/82 |

OTHER PUBLICATIONS

Liu et al., "Image Inpainting for Irregular Holes Using Partial Convolutions," *Big Data Analytics in the Social and Ubiquitous Context: 5th International Workshop on Modeling Social Media, MSM 2014, 5th International Workshop on Mining Ubiquitous and Social Environments, Muse 2014 and First International Workshop on Machine LE*, 89-105 (2018).

Major, et al., "Interpreting Medical Image Classifiers by Optimization Based Counterfactual Impact Analysis," *2020 IEEE 17th International Symposium on Biomedical Imaging (ISBI)*, 1096-1100 (2020).

Schlemper et al., "Attention Gated Networks: Learning to Leverage Salient Regions in Medical Images," *Arxiv.org*, Cornell University Library, 25 pp. (2018).

European Patent Office, International Search Report in International Patent Application No. PCT/EP2021/064763, mailed Jul. 19, 2021, 3 pp.

European Patent Office, Written Opinion in International Patent Application No. PCT/EP2021/064763, mailed Jul. 19, 2021, 9 pp.

\* cited by examiner

| P | $H_{ours}$ | $H_{grad}$ | $H_{sal}$ | $L_{ours}$ | $L_{grad}$ | $L_{sal}$ |
|---|---|---|---|---|---|---|
| 50 | 188.12±68.3 | 296.29±54.4 | 240.83±36.2 | 0.45 | 0.06 | 0.27 |
| 75 | 188.12±68.3 | 274.86±40.0 | 257.85±38.6 | 0.45 | 0.23 | 0.30 |
| 90 | 188.12±68.3 | 243.80±59.6 | 259.57±43.7 | 0.45 | 0.28 | 0.25 |

| P | $A^{mammo}$ | $A^{mammo}$ | $A^{mammo}$ | $A^{tbc}$ | $A^{tbc}$ | $A^{tbc}$ |
|---|---|---|---|---|---|---|
| 50 | 0.07±0.04 | 1.10±0.10 | 1.10±1.14 | 0.06±0.0 | 0.50±0.0 | 0.50±0.0 |
| 75 | 0.07±0.04 | 0.55±0.21 | 0.55±0.2 | 0.06±0.0 | 0.25±0.0 | 0.25±0.0 |
| 90 | 0.07±0.04 | 0.22±0.40 | 0.22±0.43 | 0.06±0.0 | 0.10±0.0 | 0.10±0.0 |

FIG. 4

DOMAIN AWARE MEDICAL IMAGE CLASSIFIER INTERPRETATION BY COUNTERFACTUAL IMPACT ANALYSIS

CROSS-REFERENCE TO RELATED APPLICATIONS

This patent application is the U.S. national phase of copending International Patent Application No. PCT/EP2021/064763, filed Jun. 2, 2021, which claims the benefit of European Patent Application No. 20181403.5, filed Jun. 22, 2020.

FIELD OF THE INVENTION

The present invention is in the field of clinical decision support.

More specifically the invention relates to a method for finding and visualizing image regions that significantly influence classification in a tool for pathology classification in a medical image.

Background of the Invention

The last decade's success of machine learning methods for computer-vision tasks, has driven a surge in computer assisted prediction for medicine and biology. This has posed a conundrum. Current predictors, predominantly artificial neural networks (ANNS), learn a data-driven relationship between input-image and pathological classification, whose validity, i.e. accuracy and specificity, can be quantitatively tested. In contrast, this learned relationship's causality typically remains elusive. A plethora of approaches have been proposed that try to fill this gap by explaining causality through identifying and attributing salient image-regions responsible for a predictor's outcome.

Lacking a canonical mapping between an artificial neural network's (ANN's) prediction and its domain, this form of reasoning is predominantly based on local explanations (LE), that is explicit attribution-maps characterising concrete image-prediction tuples.

Typically, these attribution-maps are only loosely defined as regions with maximal influence towards the predictor, implying that any texture change within the attributed image-area will significantly change the predictors outcome. Besides technical insight these LE can provide a key benefit for clinical applications: By relating the ANN's algorithmic outcome to the user's a-priori understanding of pathology-causality, they can rise confidence in the predictor's outcome, thereby increase their clinical acceptance.

However, some additional restrictions and clarifications are needed to achieve this goal. Qualitatively, such maps need to be informative for its users, i.e. narrow down on regions of medical interest, hence coincide with medical knowledge and expectations. Furthermore, the regions characteristic, i.e. the meaning of maximal influence, must be clearly conveyed. Quantitatively, such LE need to be faithful to the underpinning predictor, i.e. dependent on architecture, parametrization, and preconditions e.g. training-set distribution.

The dominant class of methods follow a direct approach. They build upon an ANN's assumed analytic nature, and its layered internal architecture, typically utilizing a modified backpropagation approach to backtrack the ANNs activation back to the input-image. While efficiently applicable, the resulting maps lack a clear a-priori interpretation, are potentially incomplete, coarse, and as shown by recent work, possibly independent of their classifier, hence possibly delivering misleading information. Thereby they are potentially neither informative nor faithful, thus a potential risk in medical environments.

In contrast, reference-based LE approaches, directly manipulate the input image and analyse the resulting prediction's differences. Their basic idea is that an image-region's prediction-influence can be assessed by counterfactual reasoning: How would the prediction score vary, if the regions image-information would be missing, i.e. its contribution marginalized.

The classically heuristic approaches, e.g. Gaussian noise and blurring or replacement by a predefined colour, have been advanced to local neighbourhood conditioning and stronger conditional generative models. Reference based LEs have the advantage of an a-priori clear and intuitively conveyable meaning of their result, hence address informativeness for end-users.

However, in regard of medical images they come with a caveat. A prediction neutral region depicts per definition healthy tissue. Contradictory the presented approaches introduce noise and thereby possibly pathological indications or anatomically implausible tissue (cf. FIG. 1). By this, they raise the out-of-distribution problem: they expect a meaningful classification, based on an image outside the classifier's domain. Hence, they violate the needed faithfulness for clinical applications.

Marginalization for medical imaging, that is generating sound, counterfactual images-regions, hence mapping between pathological tissue representations and their healthy equivalent, has become an active research area of its own. While generative adversarial networks (GANs) deliver promising results, their clinical-application is hindered by resolution limitation, and the same underlying out-of-distribution issue. In the state of the art the locally acting, globally conditioned, per-pixel reconstruction of partial convolution inpainting (PCI) is favoured over globally acting GANs, thereby enforcing anatomically sound, image specific replacements. While overcoming out-of-distribution issues, this gradient decent based optimization method works iteratively, hence cannot be used in time restrictive environments.

It is an object of this invention to overcome the above-described problems.

SUMMARY OF THE INVENTION

The above-mentioned effects are realised by a method having the specific features set out in claim 1.

Specific features for preferred embodiments of the invention are set out in the dependent claims.

Further advantages and embodiments of the present invention will become apparent from the following description and drawings.

The invention relates to a neural network that is trained for the task of deriving the attribution of image regions that significantly influence classification in a tool for pathology classification.

A medical image is consecutively processed through (i) a contracting branch, (ii) an attenuation module, (iii) an interconnected up-sampling branch, and (iv) a final mapping module.

The contracting branch is fed with the medical image and derives the same features at different progressively decreasing resolution scales as said classification tool does.

An attenuation module is then coupled to the contracting branch. The attenuation module comprises convolutional layers and weighs the final output of the contracting branch and thereby selectively damps the forwarding of a subgroup of the above-mentioned features.

The sub-group of features after training in this context is a pathology related, subgroup of features.

Occasionally also layers performing non-linear operations may be provided.

The up-sampling branch refines the initial localization by the attenuation module. For this goal, the up-sampling branch processes the result of the attenuation module repeatedly through (a) up-sampling, (b) merging with weighted feature-maps of the corresponding resolution-scale of the contraction path and (c) convolutional layers, so as to refine the localization of said features of said sub-group.

Finally, a final mapping module projects the features onto a two-dimensional grid of same size as the initially input medical image and derives the attribution through a combination of thresholding and smoothing applied to the result of the projection.

The network learns to detect the pathology related features during training (first crudely identified and localized by the attention module, and later on refined in the up-sampling branch. This is performed through optimization of a loss function.

According to this invention, the neural network is trained by (i) feeding a plethora of learning data, structured in an assortment of batches of at least one single medical image, and (ii) assessing said network's derived final output and modifying weights of said neural network such that repeating said assessment yields an improved output and repeating steps (i) and (ii) until no further improvement is obtained.

Improved output is obtained when the output of a current step by focusing on relevant image regions, matches better with the input than it was in the previous step.

The learning data comprise a plurality of medical images, representative of an anatomical structure of interest, adhering to prerequisites and restrictions of said pathology classification tool.

The assessment of the network's derived final output comprises subsequently marginalizing attributed image-regions' contribution towards pathology classification by said classification tool for each image of a batch by altering for each image of a batch attributed pixels such that they do not affect the outcome of the classification, re-classifying an altered batch using said classification tool and quantifying the result of the re-classification.

Marginalizing a region, describes the process of neutralizing this regions contribution towards a classification score. Typically, but especially so for neural networks, a regions contribution can't be simply excluded during the classification task. Therefore, the regions need to be visually altered, without the introduction of artefacts that corrupt the images "integrity". A common technique would be blurring; while this is largely unproblematic for photographs considering medical images this potentially introduces pathologies or results in anatomical inconsistencies, which needs to be avoided at all costs. In this context marginalization therefore means to either (i) replace pathology depicting pixel-sets with healthy depictions, or (ii) keep healthy depictions unaltered.

The domain and input requirements of classification and interpretation tool must be identical and follow the data distribution of the trainings image-set. As such, the requirements encompass image dimensions, resolution, modality, used protocol, visible anatomy, and so on. The images the tools are expected to process must semantically match the images they saw during training.

In the state of the art the resulting attribution is manipulated directly. This new network approach is different in that it adapts the weights of the convolution-layers.

The approach of this invention is not a "per image" approach (the optimization has to be run for every input-image of interest), the new approach does not need any further adaptation/optimization after the initial training, i.e. will work for any appropriate input-image out of the box.

The invention discloses a resource efficient reference based faithful and informative attribution method for real time pathology classifier interpretation. Utilizing a specialized artificial neural network (ANN), and exploiting PCI's local per-pixel reconstruction, conditioned on global healthy tissue representation, it is possible to automatically enforce anatomically sound, image specific marginalization, without sacrificing computational efficiency. The ANN's objective function is formulated as a quantitative prediction problem under strict area constraints, thereby clarifying the resulting attribution map's a-priori meaning.

The approach was evaluated on public mammography data and compared against two existing state-of-the-art methods. Furthermore, the method's generalizability was exemplified by demonstrating results on a second unrelated task, namely chest X-rays data.

The solution of the present invention shows quantitatively and qualitatively a significant reduction of localization ambiguity and clearer conveying results, both without sacrificing time efficiency.

BRIEF DESCRIPTION OF THE DRAWINGS

FIG. 4 is a table showing on top Hausdorff distance H and weak localization results L, relating maps $\hat{M}$ and GT; showing at the bottom relating maps $\hat{M}$ to the organ resp. image-size.

DETAILED DESCRIPTION OF THE INVENTION

Given a pathology classifier's prediction about an input-image, it is a goal of this invention to estimate its cause by attributing the specific pixel-regions that substantially influenced the predictor's outcome.

Informally, the image-area is searched for that, if changed, results in a sufficiently healthy image able to fool the classifier. The resulting attribution-map needs to be informative for the user, and faithful to its underpinning classifier. While we can quantitatively test for the later, the former is an ill-posed problem.

We therefore formalize as follows:

Let I denote an image of a domain I with pixels on a discrete grid $m1 \times m2$, c a fixed pathology-class, and f a classifier capable of estimating $p(c|I)$, the probability of c for I.

Also let M denote the attribution-map for image I and class c, hence $M \in M^{m_1 \times m_2}(\{0,1\})$.

Furthermore, assume a function $\pi(M)$ proficient in marginalizing all pixel regions attributed by M in I such that the result of the operation is still within the domain of f. Hence, $\pi(M)$ yields a new image similar to I, but where we know all regions attributed by M to be healthy per definition.

Therefore, assuming I depicting a pathological case, M attributing only pathology pixel representations, $\pi(M)$ is a healthy counterfactual image to I. In any case $p(c|\pi(M))$ is well defined.

Using this notation, we can formalize what an informative map $\hat{M}$ means, hence give it an a-priori, testable semantic meaning.

We define it as:

$$\hat{M} := \arg\min_{|v|} d(M) \text{ where } |\hat{v}| := \{p(c|\pi(M)) \le \theta, d(M) \le \delta, M \in S\},$$

$\theta$ is the classification-threshold, d is a metric measuring the attributed area, $\delta$ a constant limiting the maps attributed area, and S the set of smooth, i.e. compact and connected, masks. Note that any map of $M^{m_1 \times m_2}(\{0,1\})$ can be (differentiable) mapped into S by taking the smoothed maximum of a convolution with a Gaussian kernel. In this form $\hat{M}$ is clearly defined and can be intuitively understood by end-users.

Solving for $\hat{M}$ requires choosing (i) an appropriate measure d (e.g. the map area in pixels), (ii) an appropriate size-limit $\delta$ (e.g. n times average mass-size for mammography), and (iii) a fitting marginalization technique $\pi(\cdot)$. In the following is described how we solve for $\hat{M}$ through an ANN, and overcome the out-of-domain obstacles by partial convolution for marginalization.

Architecture

Iteratively finding solutions for $\hat{M}$ is typically time-consuming.

Figure 1A:
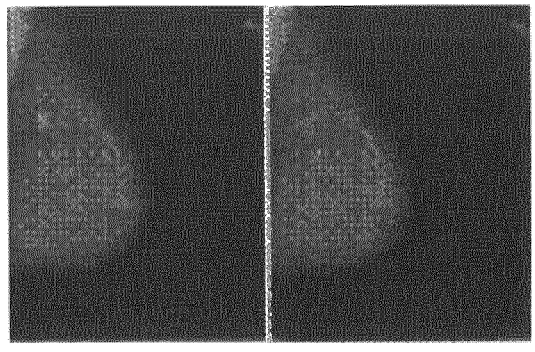
FIG. 1 is an overview of the marginalization performance: first two images depict marginalization of mass tissue in a mammography image, the four images in the middle demonstrate blurring, averaging and inpainting (method of this invention) the patch coming from the first image. The last image displays the ROC curves of the mammography classifier vs. healthy pixel inpainting only in healthy/pathological structures.
Figure 1B:
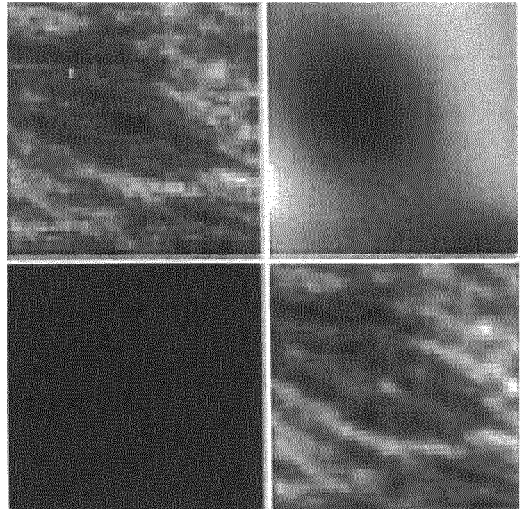
Figure 1C:
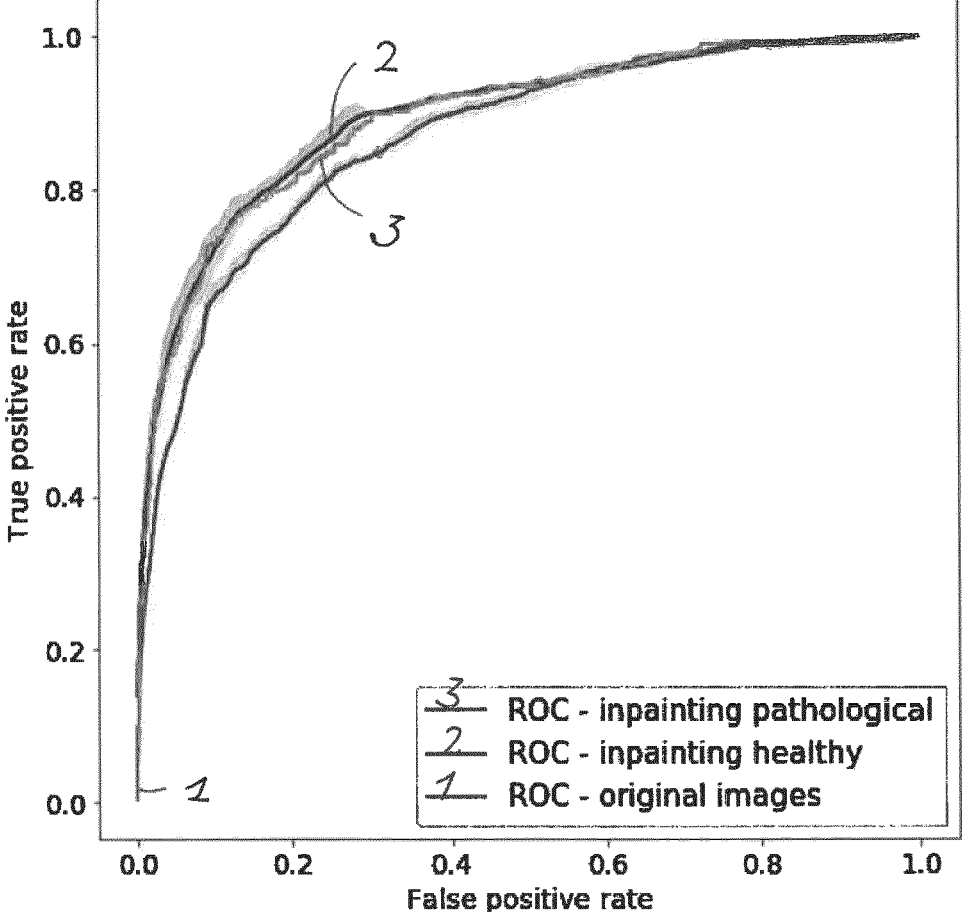
Figure 2:
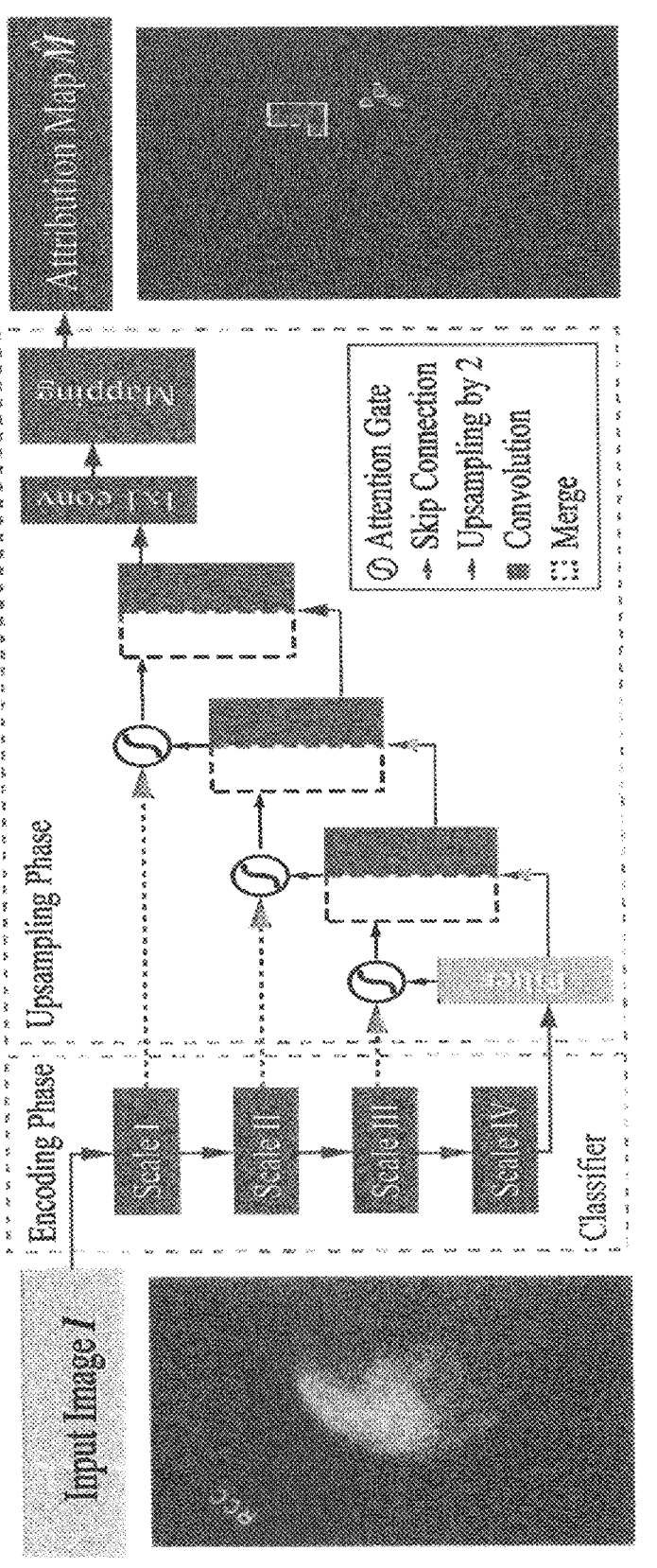
FIG. 2 shows the architecture of the proposed attribution network.
Figure 3:
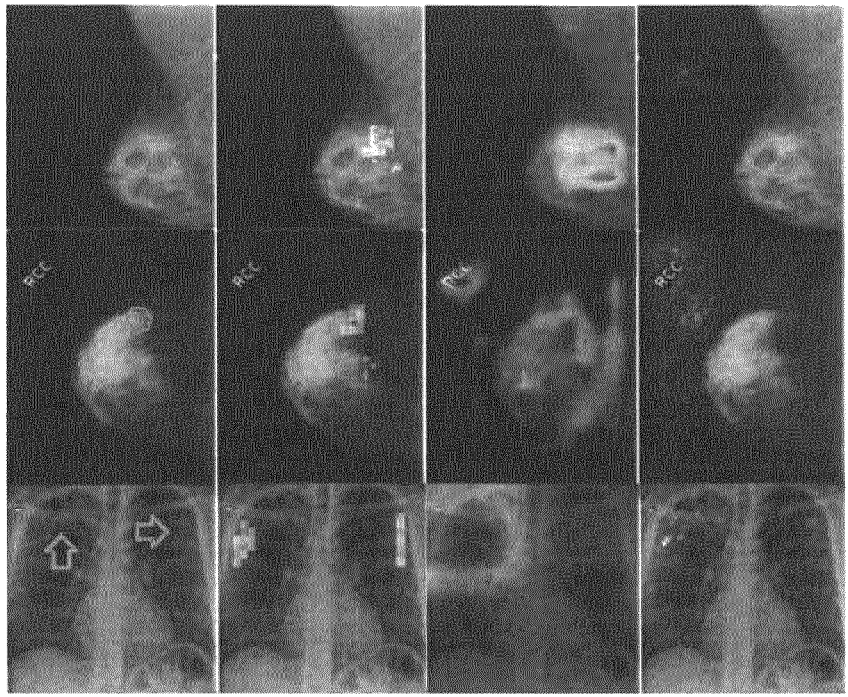
FIG. 3 shows the result of Result attribution heatmaps for mammography and chest X-ray: (a) original image overlayed with annotation contours (and arrows for missing GT), (b) the attribution framework according to this invention, (c) GradCAM (d) Saliency.

Therefore, we develop a dedicated ANN, capable of finding the desired attribution in a single forward pass. For this, the network learns on multiple resolutions, to focus on and combine relevant classifier-extracted features (cf. FIG. 2).

We built on a U-Net architecture, where the down-sampling, encoding branch consists of the trained classifier sans its classification layers. These features, $x_{i,j,l}$, are subsequentially passed through a feature-filter, performing $$x_{i,j,l} \cdot \sigma((W_m \rho(W^r x_{i,j,l} + b_l) + b_m)$$

where $\rho$ is an element-wise nonlinearity (namely a rectified linear unit), $\sigma$ a normalization function (sigmoid function) and W. resp. b. linear transformation parameters.

This is similar to additive attention which, compared to multiplicative attention has shown better performance on high dimensional input-features. The upsampling branch consists of four consecutive blocks of: upsampling by a factor of two, followed by convolution and merging with attention-gate weighted features from the classifier of the corresponding resolution scale. After final upsampling back to input-resolution, we apply $1 \times 1$ conv. of depth two, resulting in two channels $c_{1,2}$. The final attribution-map $\hat{M}$ is derived through thresholding $$\frac{|c_1|}{|c_1| + |c_2|}$$

Intuitively, the network attenuates the classifiers final features, generating an initial localization. This coarse map is subsequently refined by additional weighting and information from higher resolution features (cf. FIG. 2). We train the network, by minimizing $$L(M) = \varphi(M) + \psi(M) + \lambda \cdot R(M), s.t. d(M) \le \delta$$

where $\varphi(M) := -1 \cdot \log(p(c|\pi(M)))$, $\psi(M) := \log(\text{odds}(I)) - \log(\text{odds}(\pi(M)))$, hence weigh the probability of the marginalized image, enforcing $p(c|\pi(M)) \le \theta$.

In this specific embodiment an additional regularization-term was introduced: a weighted version of total variation, which experimentally greatly improved convergence. All terms where normalized by mapping through a generalized logistic function. The inequality constrain was enforced by the method proposed in the state of the art method Kervadec, H., Dolz, J., Tang, M., Granger, E., Boykov, Y., Ayed, I.: Constrained-cnn losses forweakly supervised segmentation (2018), http://arxiv.org/abs/1805.04628.

After mapping into S, any solution to L will also estimate $\hat{M}$, thereby yield our desired attribution-map. The parametrization is task/classifier-dependent and will be described in following sections.

Marginalization

The goal is to marginalize image regions marked by the network of the invention during it's training process. Therefore, we aim for an image inpainting method to replace pathological tissue by healthy appearance. It has to handle arbitrary maps introduced during training. The inpainting-result should resemble valid global anatomical appearance with high quality local texture. To address the above mentioned criteria we apply the U-net like architecture with partial convolution blocks and automated layer-by-layer mask updating of Liu, G., Reda, F., Shih, K., Wang, T. C., Tao, A., Catanzaro, B.: Image inpainting for irregular holes using partial convolutions. In: Proceedings of ECCV. pp. 85-100 (2018).

This convolution considers only unmasked inputs in the current sliding window. This architecture setup and it's loss function were used as introduced in the article mentioned higher (Image inpainting for irregular holes using partial convolutions).

The loss function for training the inpainting network focuses on both per-pixel reconstruction quality of the masked regions and on overall appearance of the image. A perceptual and a style loss are introduced which match images in a mapped feature space to enhance the overall appearance and a total variation term is used to ensure a smooth transition between hole regions and present image regions in the final result.

Experimental Set-Up

Datasets: We evaluated our framework on two different datasets, on mammography scans and on chest X-ray images. For mammography, the two sets DDSM [Heath, M., Bowyer, K., Kopans, D., Moore, R., Kegelmeyer, W.: The digital database for screening mammography. In: Proceedings of IWDM. pp. 212-218 (2000)] CBIS-DDSM [Lee, R., Gimenez, F., Hoogi, A., Rubin, D.: Curated breast imaging subset of DDSM.

The Cancer Imaging Archive 8 (2016). https://doi.org/10.7937/K9/TCIA.2016.7O02S9CY].

were used, downsampled to a resolution of 576×448 pixels. Data was split into 1231/2000 pathological/healthy samples for training, and into 334/778 scans for testing. Pixel-wise ground-truth annotation (GT) is available.

We demonstrate generalization on a private collection of healthy and tuberculotic (TBC) frontal chest X-ray images, at a downsampled resolution of 256×256. We split healthy images into sets of 1700/135 for training resp. validation set, and TBC cases into 700/70. The test set contains 52 healthy and 52 TBC samples. No pixel-wise GT information was provided for this data.

Classifiers: The backbone of our mammography attribution network is a MobileNet classifier for categorization into healthy samples and scans with masses. [Howard, A., Zhu, M., Chen, B., Kalenichenko, D., Wang, W., Weyand, T., Andreetto, M., Adam, H.: MobileNets: Efficient convolutional neural networks for mobile vision applications. arXiv preprint arXiv:1704.04861 (2017)].

The network was trained using the Adam optimizer with batchsize of 4 and learning rate of 1e-5 for 250 epochs with early stopping. The network was pretrained with 50 k 224×224 pixel patches from the training data for the same task. The TBC attribution utilized a DenseNet-121 classifier for the binary classification task of healthy or TBC case. [Huang, G., Liu, Z., van der Maaten, L., Weinberger, K. Q.:
Densely connected convolutional networks. In: The IEEE Conference on Computer Vision and Pattern Recognition (CVPR) (July 2017)].

It was trained using the SGD momentum optimizer with a batchsize of 32 and learning rate of 1e-5 for 2000 epochs. The network was pretrained by the CheXpert dataset. [Irvin, J., Rajpurkar, P., Ko, M., Yu, Y., Ciurea-Ilcus, S., Chute, C., Marklund, H., Haghgoo, B., Ball, R. L., Shpanskaya, K. S., Seekins, J., Mong, D. A., Halabi, S. S., Sandberg, J. K., Jones, R., Larson, D. B., Langlotz, C. P., Patel, B. N., Lungren, M. P., Ng, A. Y.: Chexpert: A large chest radiograph dataset with uncertainty labels and expert comparison. AAAI (2019)].

Marginalization: Both inpainter networks were trained on the healthy training samples with a batch size of 1 for mammography and 5 for chest X-ray. The training was done in two phases, the first phase with batch normalization (BN) after each convolution layer and the second with BN only in the decoder part. The network for the mass classification task was trained with learning rates of 1e-5/1e-6 and for the TBC classification task of 2e-4/1e-5 for the two phases. For each image irregular masks were generated which mimic possible configurations during the attribution network training.

Attribution: We used the last four resolution-scales of each classifier, and in all cases the features immediately after activation function, following the convolution. The weights of the pre-trained ANNs where kept fixed during the complete process. Filter-depths of the up-sampling convolution blocks correspond with the equivalent down-sampling filters, filter-size is fixed to 1×1.

Up-sampling itself is done via neighbourhood up-sampling. We used standard gradient descend, and a cyclic learning rate, varying between 1e-6 and 1e-4, and trained for up to 5000 epochs with early stopping. We thresholded the masks at 0.55, and used a gaussian RBF with $\sigma=5e-2$, and a smoothing parameter of 30. All trainable weights where random normal initialized.

Results

Marginalization: To evaluate the inpainter network we assessed how much the classification score of an image changes, when pathological tissue is replaced.

Thus, we computed ROC curves using the classifier on all test samples
(i) without any inpainting as reference, and for comparison random sampled inpainting
(ii) only in healthy respective
(iii) pathological scans over 10 runs.

The clear distance between the ROC curves of the image classifiers without any inpainting and with inpainting in pathological regions shows that the classifier is sensitive to changes around pathological regions of the image. Moreover, it is visible that the ROC curves of inpainting in healthy tissues follow closely the unaffected classifier ROC curve. Accordingly, the AUCs for both classifiers are 0.89, the mean AUCs of the mammo/chest healthy inpainters are 0.89/0.88 and the mean AUC of the pathological mammo inpainter is 0.86.

Attribution: We compared our attribution network against the gradient explanation saliency map (SAL), and the network/gradient-derived Grad-CAM visualizations. We limited our comparisons to these direct approaches, as they are widely used within medical imaging, and inherently valid. Popular reference based approaches either utilize blurring, noise or some other heuristic, or where not available, therefore could not be considered. Quantitatively, we relate (i) the result-maps to both organ, and ground truth (GT) annotations, and (ii) to each other.

Particular for (i) we studied the Hausdorff distances H between GT and $\hat{M}$ indicating location proximity. Lower values demonstrate better localization in respect to the pathology.

Further we performed a weak localization experiment: per image, we derived bounding boxes (BB) for each connected component of GT and $\hat{M}$ attributions.

A GT BB counts as found, if any $\hat{M}$ BB has an $IOU \leq 0.125$. We chose this threshold, as a proficient classifier presumably focuses on the masses boundries and neighborhoods, thereby limiting possible BB-overlap. We report average localization L. For (ii) we derived the area ratio A between $\hat{M}$ and organ-mask (breast-area) or whole image (chest X-ray). Again, lower values indicate a smaller thereby clearer map. Note that for (i) we could only derive values for mammography. All measurements were performed on binary masks, hence GradCAM and SAL had to be thresholded. We chose the 50, 75, 90 percentiles, i.e. compared 50, 25, 10 per-cent of the map-points. Where multiple pathologies, or mapping results occurred we used the median for a robust estimation per image.

Statistically significant difference between all resulting findings was formalized using Wilcoxon signed-rank tests, for $\alpha<0.05$. Additionally we tested our network with randomised parameterization (labels have no effect in our case).

As seen in Table 1, our framework achieves significant lower H, than either GradCAM or SAL at all threshold levels. Moreover, we report significantly better weak localization (L) which underlines the higher accuracy of our approach. Qualitatively our attribution-maps are tighter focused and enclose the masses. The former is also expressed by the lower overlap values A. All p-values where significantly bellow 1e-2 thereby hardening our results. Randomization of the ANNs weights yields pure noise maps.

The invention claimed is:

1. A neural network, trained for the task of deriving the attribution of image regions that significantly influence classification in a tool for pathology classification, in which a medical image is consecutively processed through (i) a contracting branch, (ii) an attenuation module, (iii) an inter-connected up-sampling branch, and (iv) a final mapping module, wherein (i) the contracting branch is fed with said medical image, and derives the same features relating to a pathology of interest at different progressively decreasing resolution scales as said classification tool, (ii) the attenuation module is coupled to the contracting branch and comprises convolutional layers, weighs the final output of the contracting branch and thereby selectively damps the forwarding of a subgroup of said features relating to a pathology of interest, (iii) the up-sampling branch refines this initial localization of the attenuation module, by processing the result of the attenuation module repeatedly through (a) up-sampling, (b) merging with attention-gate weighted feature-maps of the corresponding resolution-scale of the contraction path and (c) convolutional layers, so as to refine the localization of said features of said sub-group, (iv) the final mapping module projects the features onto a two-dimensional grid of same size as said medical image and derives the attribution through a combination of thresholding and smoothing applied to the result of the projection, wherein said neural network is trained by (a) feeding a plethora of learning data, structured in an assortment of batches of at least one single medical image, and (b) assessing said network's derived final output and modifying weights of said neural network such that repeating said assessmentyields an improved output and repeating steps (a) and (b) until no further improvement is obtained, wherein said learning data comprise a plurality of medical images, representative of an anatomical structure of interest, adhering to prerequisites and restrictions of said pathology classification tool, and said assessment of the network's derived final output comprises subsequently marginalizing attributed image regions' contribution towards pathology classification by said classification tool for each image of a batch by altering for each image ofa batch attributed pixels such that they do not affect the outcome of the classification, re-classifying an altered batch using said classification tool and quantifying the result of the re-classification.

* * * * *